United States Patent [19]

Eberhardt et al.

[11] Patent Number: 5,072,225

[45] Date of Patent: Dec. 10, 1991

[54] RADAR SIDELOBE IDENTIFICATION AND DISCRIMINATION SYSTEM

[75] Inventors: Paul R. Eberhardt, Encinitas; William F. McNaul, Ramona, both of Calif.

[73] Assignee: Cubic Defense Systems, Inc., San Diego, Calif.

[21] Appl. No.: 224,716

[22] Filed: Jul. 27, 1988

[51] Int. Cl.⁵ .................................. G01S 13/38
[52] U.S. Cl. .................... 342/200; 342/379; 342/367
[58] Field of Search .............. 342/379, 200, 367, 44, 342/89, 98, 102

[56] References Cited

U.S. PATENT DOCUMENTS

| | | | |
|---|---|---|---|
| 3,248,731 | 4/1966 | Bickmore et al. | 342/379 |
| 3,735,266 | 5/1973 | Amitay | 342/361 X |
| 4,143,372 | 3/1979 | Salvaudon et al. | 342/94 |
| 4,152,702 | 5/1979 | Piesinger | 342/367 |
| 4,162,497 | 7/1979 | Hulland et al. | 342/379 |
| 4,250,506 | 2/1981 | McNaul | 342/367 |
| 4,266,226 | 5/1981 | McNaul et al. | 342/379 |
| 4,612,549 | 9/1986 | Geyer, Jr. et al. | 342/379 |
| 4,870,424 | 9/1989 | Lalezari et al. | 342/379 |

Primary Examiner—John B. Sotomayor
Attorney, Agent, or Firm—Brown, Martin, Haller & McClain

[57] ABSTRACT

An apparatus and method for identifying sidelobe transmitted and/or received radar signals. The apparatus is utilized in a radar system having a transmitter for generating at least one detection signal, an antenna system defining a mainbeam and sidelobe radiation pattern for transmitting each detection signal and for receiving electromagnetic signals including echo signals each corresponding to a reflection from an object of a transmitted detection signal, and a receiver system for processing each received echo signal. The apparatus is embodied as a system for identifying each echo signal received upon the antenna system sidelobe and each received echo signal having a corresponding detection signal transmitted on the antenna system sidelobe. The system comprises a modulation system for modulating each sidelobe radiated detection signal and each sidelobe received echo signal; and a detector system for, receiving from the antenna system each echo signal, identifying each echo signal having the modulation and providing an indication signal for each echo signal having the modulation.

14 Claims, 5 Drawing Sheets

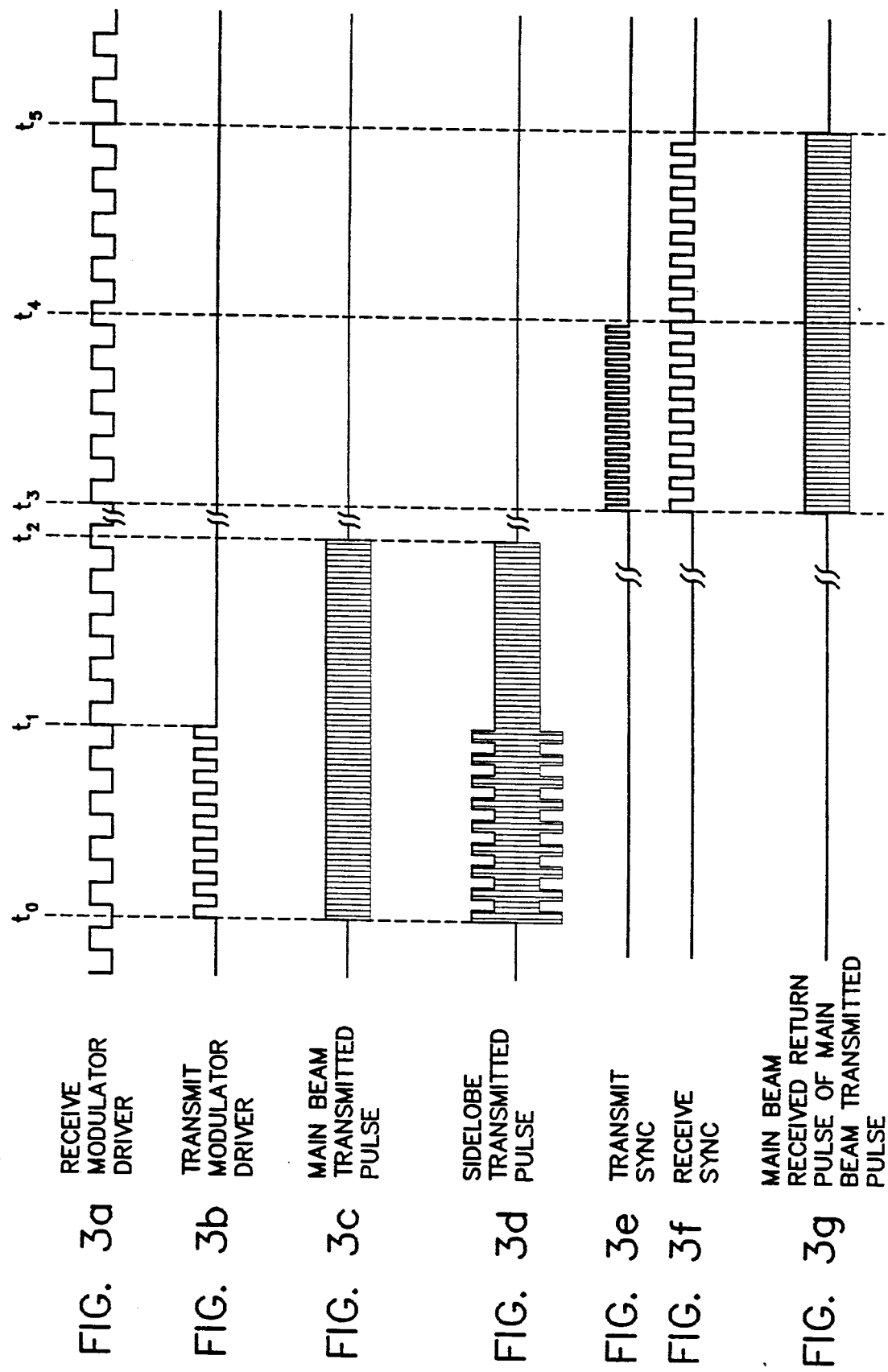

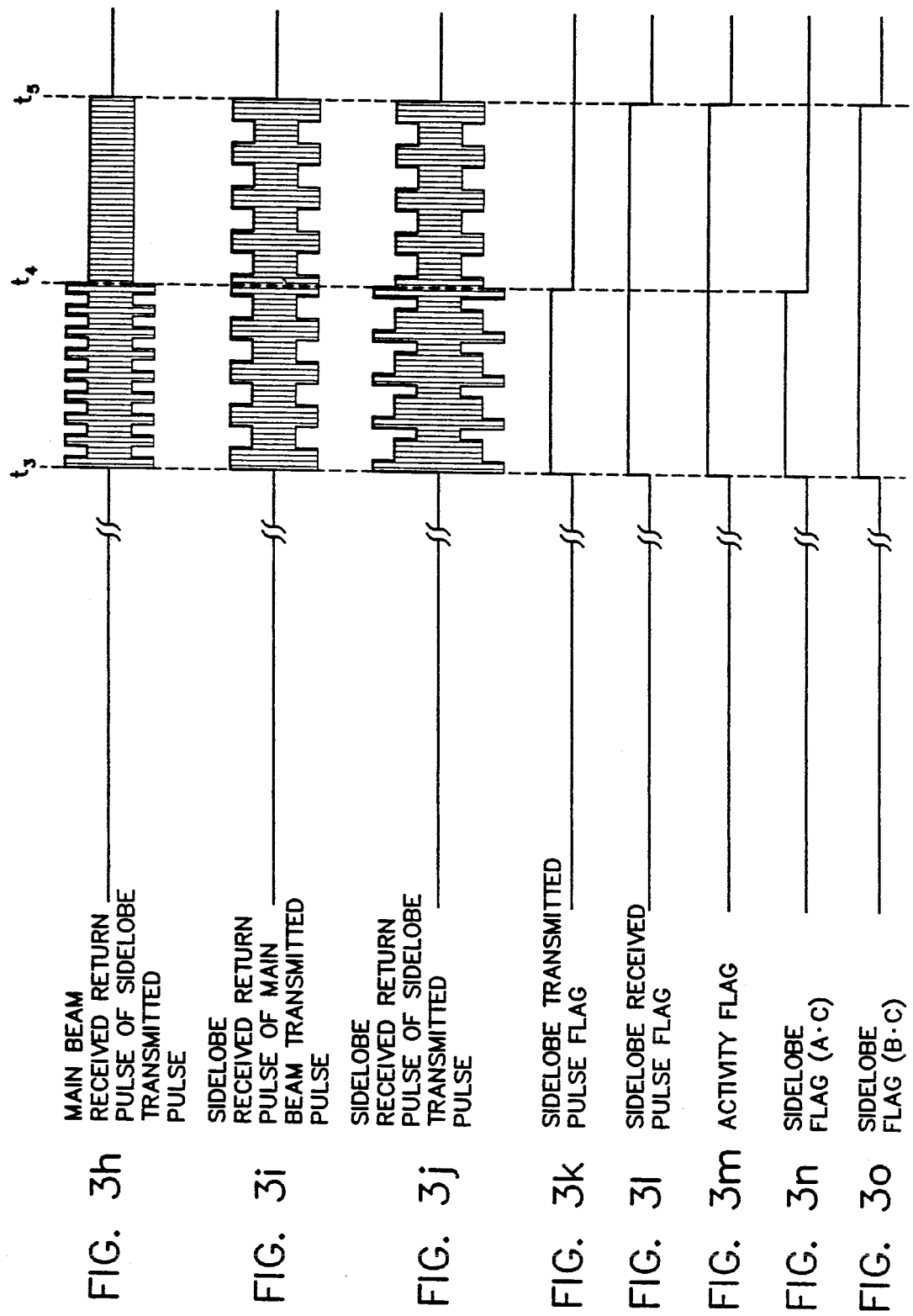

RADAR SIDELOBE IDENTIFICATION AND DISCRIMINATION SYSTEM

BACKGROUND OF THE INVENTION

I. Field of the Invention

The present invention relates to radar systems. More specifically, the present invention relates to a novel and improved system for identifying signals transmitted or received on the sidelobes of a radar system antenna.

II. Description of the Related Art

In the past, communication systems have been developed that label the signals transmitted on the sidelobes of the communications system antenna while the mainbeam transmitted signals are not labeled. A communications system receiving the transmitted signal can determine whether the signal, as received, was transmitted on the mainbeam or sidelobes of the transmitting system antenna. The signal transmitted on the sidelobes of the transmitting antenna contains the labeling and if the received signal contains such labeling it is detected. The detection of the labeling in the received signal is indicative that the received signal was transmitted on a sidelobe of the transmitting antenna.

It is also known to use in communication systems the technique of labeling signals received on the sidelobes of the receiving system antenna. The signals received on the mainbeam of the receiving antenna, however, are not labeled. In the receiving system, if the signal is received on one of the antenna sidelobes it is labeled and the labeling is detected in the receiving system. Detection of labeling in the received signal is, therefore, indicative that the signal received was received on one of the sidelobes, rather than the mainbeam, of the receiving system antenna.

Communication systems for discriminating between signals arriving on the mainbeam and the sidelobes of a receiving antenna along with communication systems for discriminating between signals transmitted on the mainbeam or transmitting antennas are known. Examples of such systems are disclosed in U.S. Pat. No. 4,250,506, entitled "Sidelobe Discriminator" issued Feb. 10, 1981 in the name of William F. McNaul, one of the inventors of the present invention, and assigned to the assignee of the present invention; and U.S. Pat. No. 4,266,2276, also entitled "Sidelobe Discriminator" issued May 5, 1981 in the names of William F. McNaul and Paul R. Eberhardt, both inventors of the present invention, and also assigned to the assignee of the present invention.

SUMMARY OF THE INVENTION

The present invention is a novel and improved method and system for use in a radar system for identifying signals either transmitted or received upon the sidelobes of the radar system antenna from mainbeam transmitted and mainbeam received signals.

The present invention utilizes novel techniques for implementation in a radar system so as to identify antenna sidelobe transmitted and/or received signals. The system employs a method for transmitting a detection signal on at least one of an antenna mainbeam and sidelobes. The detection signal transmitted on each one of the antenna sidelobes is modulated according to a first predetermined modulation pattern. An echo signal, corresponding to a reflection of the transmitted detection signal from an object, is received on at least one of the antenna mainbeam or sidelobes. The echo signal received on each of said sidelobes is modulated according to a second modulation pattern. Each received echo signal having at least one of the first or second predetermined modulation patterns is detected. An identification signal is provided in response to the detection of at least one of the predetermined modulation patterns in the received echo signals. It is, therefore, an object of the present invention to provide a new and improved method and system for identifying sidelobe transmitted and sidelobe received radar signal.

BRIEF DESCRIPTION OF THE DRAWINGS

These and other features, objects and advantages of the present invention will become more apparent from the description set forth herein when taken in conjunction with the drawings in which like reference characters correspond throughout and wherein:

FIGS. 3a-3o illustrate an exemplary timing diagram for signals corresponding to the embodiment of FIG. 1.

DETAILED DESCRIPTION OF THE PREFERRED EMBODIMENTS

Figure 1:
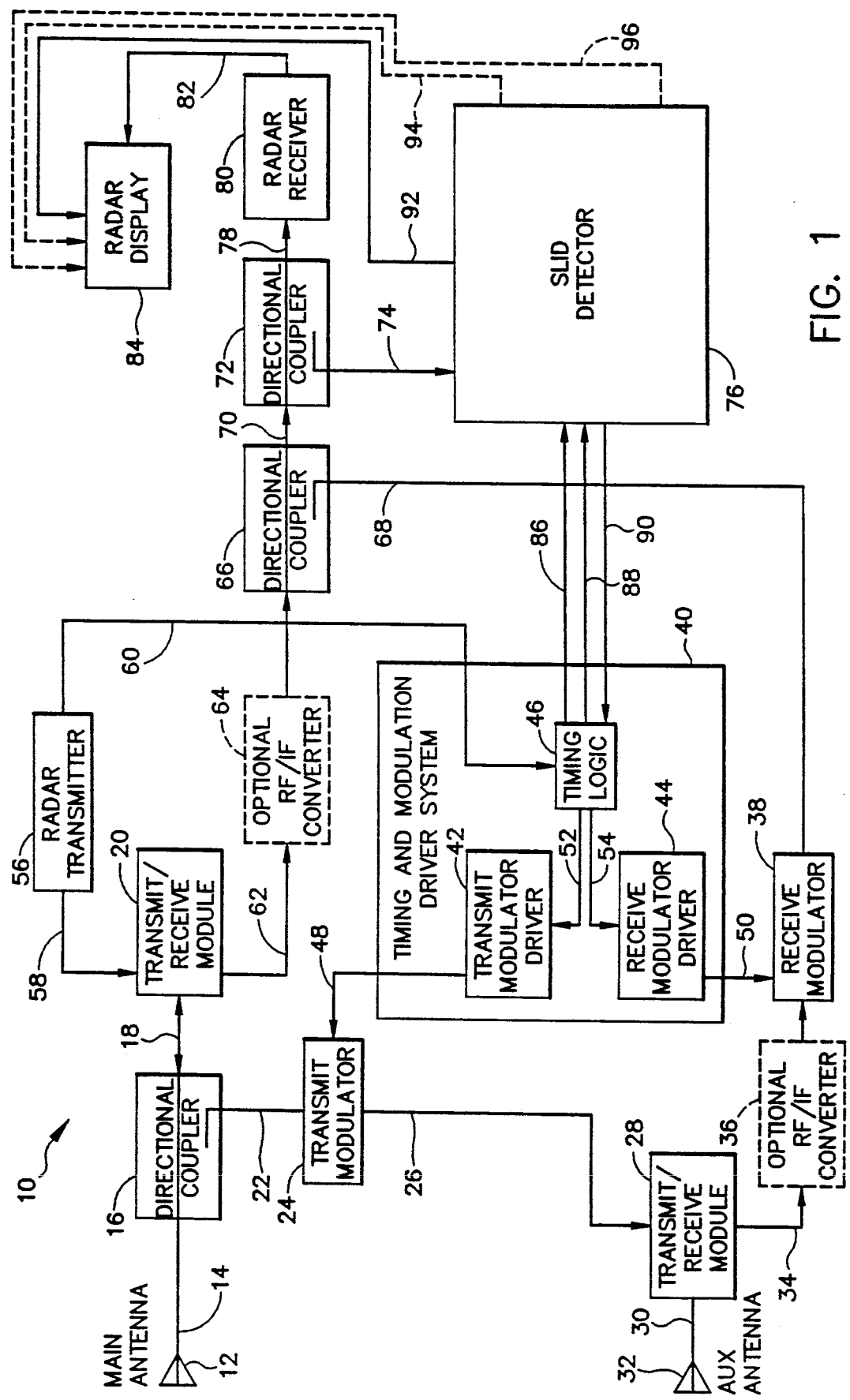
FIG. 1 is a block diagram of one preferred embodiment of a radar system employing the novel features of the sidelobe identification and discrimination system of the present invention.

Referring to FIG. 1 of the drawings, one preferred embodiment of the sidelobe identification and discrimination system of the present invention is illustrated. In FIG. 1, a radar system 10 is illustrated as including main antenna 12 that is coupled by line 14 to directional coupler 16. Directional coupler 16 is also coupled by line 18 to transmit/receive module 20. Transmit/receive module 20 is typically comprised of a circulator, and associated limiter and amplification circuitry that is well known in the art. Directional coupler 16 is also coupled by line 22 to an input of transmit modulator 24.

Transmit modulator 24 has an output that is coupled by line 26 to an input of transmit/receive module 28. Transmit/receive module 28 also has an input that is coupled by line 30 to auxiliary antenna 32. Transmit/receive module 28 has an output that is coupled by line 34 to an input of optional RF/IF converter 36, illustrated in dashed lines, or directly to an input of receive modulator 38. When optional RF/IF converter 36 is utilized, the output thereof is coupled to the input of receive modulator 38.

Both transmit modulator 24 and receive modulator 38 are coupled to receive inputs from timing and modulation driver system 40. Timing and modulation driver system 40 is comprised of transmit modulator driver 42, receive modulator driver 44 and timing logic 46. The output of transmit modulator driver 42 is coupled by line 48 to a modulation signal input of transmit modulator 24. Similarly, the output of receive modulator driver 44 is coupled by line 50 to a modulation signal input of receive modulator 38. Timing logic 46 includes a pair of timing outputs that are respectively coupled by lines 52 and 54 to corresponding inputs of transmit modulator driver 42 and receive modulator driver 44.

Radar transmitter 56 has a radar signal output coupled by line 58 to an input of transmit/receive module 20. Radar transmitter 56 also has a control signal output that is coupled by line 60 to a control signal input of timing logic 46. Transmit/receive module 20 has an output coupled by line 62 to an input of optional RF/IF converter 64, illustrated in dashed lines, or directly to a port of directional coupler 66. When optional RF/IF converter 64 is utilized, the output thereof is coupled to a port of directional coupler 66. Directional coupler 66 is also coupled at a second port by line 68 to the output of receive modulator 38. The third port of directional coupler 66 is coupled by line 70 to a port of directional coupler 72.

Directional coupler 72 is coupled at a second port by line 74 to a radar signal input of sidelobe identification and discrimination (SLID) detector 76. A third port of directional coupler 72 is coupled by line 78 to the input of radar receiver 80. The output of radar receiver 80 is coupled by line 82 to a radar signal input of radar display 84.

SLID detector 76 has a pair of inputs, transmit sync and receive sync, respectively coupled by lines 86 and 88 to corresponding outputs of timing logic 46. SLID detector 76 has an activity flag output that is coupled by line 90 to a corresponding input of timing logic 46. SLID detector 76 has a sidelobe flag output that is coupled by line 92 to a corresponding input of radar display 84. SLID detector 76 also has optional sidelobe transmit flag and sidelobe receive flag outputs that are respectively coupled to corresponding inputs of radar display 84 by lines 94 and 96.

In operation of the system, radar transmitter 56 generates a radar pulse which is coupled by line 58 through transmit/receive module 20. The radar pulse is coupled via line 18 through directional coupler 16 where it is coupled by line 14 to main antenna 12. Main antenna 12 radiates the pulse on the antenna mainbeam and associated sidelobes.

Upon the output of the radar pulse from radar transmitter 56, radar transmitter 56 provides contemporaneously therewith a control signal on line 60 to timing logic 46. Timing logic 46 is responsive to the control signal for generating and providing a signal on line 52 which enables transmit modulator driver 42. Transmit modulator 42 when enabled provides a transmit modulator driver signal via line 48 to transmit modulator 24.

Directional coupler 16 is utilized to couple a portion of the transmitted radar pulse via line 22 to transmit modulator 24. Transmit modulator 24 modulates the received portion according to the transmit modulator driver signal generated by transmit modulator driver 42. Transmit modulator 42 may impress either amplitude, frequency, phase, or etc. type of modulation pattern onto the portion of the radar pulse. The modulated radar pulse is output from transmit modulator 24 upon line 26 to transmit/receive module 28. Transmit/receive module 28 couples the modulated radar pulse via line 30 to auxiliary antenna 32. Auxiliary antenna 32 is positioned relative to main antenna 12 for transmitting signals in a radiation pattern coincident with the sidelobe radiation pattern of main antenna 12. Accordingly, the radar pulse radiated in the antenna system sidelobe radiation pattern is impressed with a unique and identifiable modulation pattern.

In the radar application, the signal transmitted in the antenna system mainbeam is the unmodulated radar pulse generated by the radar transmitter. However, the sidelobe transmitted pulse includes the transmit modulation pattern. Depending upon a target or object position with respect to the mainbeam or sidelobe radiation pattern, the object reflects a portion of the transmitted signal as an echo signal. When the object is within the mainbeam, the unmodulated signal is reflected. Similarly, when the target is within the sidelobe, the reflected signal contains the transmit modulation pattern. Due to the time lag between the transmission of the detection signal from the radar system and reception of the echo signal, the radar system antenna positioning may be changed. Accordingly, a detection signal transmitted on the mainbeam or a sidelobe may be received on a different one than transmitted upon. For example, the object may reflect a radar pulse transmitted on the sidelobes which is then received upon the mainbeam. Similarly, the object may reflect a radar pulse transmitted on the mainbeam which is then received upon one of the sidelobes. However, certain cases may occur where the echo signal received on the mainbeam corresponds to the signal transmitted on the mainbeam, or the echo signal received on the sidelobe corresponds to a signal transmitted on a sidelobe.

An echo signal received upon the mainbeam is received by antenna 12 and coupled by line 14 through directional coupler 16. Directional coupler 16 couples the mainbeam received signal via line 18 to transmit/receive module 20. Transmit/receive module 20 couples the mainbeam received signal on line 62 through optional RF/IF converter 64, if utilized, to directional coupler 66. The mainbeam received signal is coupled by directional coupler 66 via line 70 to directional coupler 72. The mainbeam received signal is then coupled by directional coupler 72 via line 78 to radar receiver 80 and ultimately to radar display 84.

A portion of the mainbeam received signal is also coupled by directional coupler 72 to SLID detector 76 upon line 74. SLID detector 76, upon detecting that the mainbeam received signal as a valid radar pulse, generates an activity flag signal which is output on line 90 to timing logic 46. Timing logic 46 in response to the activity flag signal generates transmit and receive sync signals that are respectively output on lines 86 and 88 to SLID detector 76. The transmit sync signal is utilized in detecting whether the mainbeam received signal contains the transmit modulation pattern. Detection of the transmit modulation pattern in the mainbeam received signal is indicative that the mainbeam received signal corresponds to a radar pulse that was transmitted on a sidelobe.

Timing logic 46 is also responsive to the activity flag signal for generating a reset signal which coupled by line 54 to receive modulator 44. Receive modulator driver 44 is typically a free running oscillator that generates a receive modulator driver signal which is output on line 50 to receive modulator 38. Receive modulator 44 is responsive to the reset signal for synchronizing the the receive modulator driver signal.

With auxiliary antenna 32 aligned for receiving echo signals coincident with the sidelobes of main antenna 12, any signal received upon the sidelobes of main antenna 12 are also received upon auxiliary antenna 32. In the case where the echo signal is received upon the mainbeam of main antenna 12, no signal is received upon auxiliary antenna 32. However, when the echo signal is received upon a sidelobe of main antenna 12, it is also received at auxiliary antenna 32. The sidelobe received signal of main antenna 12 is similarly coupled through the system as was the mainbeam received signal. The sidelobe received signal of main antenna 12 is coupled through directional coupler 16, transmit/receive module 20 to directional coupler 66.

Auxiliary antenna 32 receives a portion of the echo signal corresponding to the main antenna sidelobe received echo signal. The auxiliary antenna received signal is coupled by line 30 to transmit/receive module 28. The auxiliary antenna received signal is output from transmit/receive module 28 upon line 34 through optional RF/IF converter 36, if utilized, to receive modulator 38. Receive modulator 38 in response to the receive modulator driver signal on line 50, impresses a unique modulation onto the auxiliary antenna received signal. Usually the sidelobe receive modulation pattern is different from the transmit modulation pattern, however, in certain cases it may be the same type of modulation. Receive modulator 38 may impress either amplitude, frequency, phase or etc. type of modulation pattern onto the signal received upon antenna 32. The modulated signal is output from receive modulator 38 via line 68 to a port of directional coupler 66. Directional coupler 66 combines the modulated signal output from receive modulator 38 with the main antenna received signal. The signal output from directional coupler 66 is coupled through directional coupler 72 to radar receiver 80 and SLID detector 76. It should be understood that the detection of a valid echo signal by SLID detector 76 and the operation of timing logic 46, receive modulator driver 44, and receive modulator 38 are such that the synchronization of the receive modulator drive occur almost simultaneously. Upon detection of the receive modulation pattern, SLID detector 76 generates a sidelobe flag signal that is output on line 92 to radar display 84. SLID detector 76 may also generate and output via line 96 to radar display 84 a sidelobe receive flag signal as an indication that the received echo signal was received upon a sidelobe. Radar display 84 uses the echo signal received from radar receiver 80 along with the sidelobe flag signal and sidelobe receive flag, if provided, for generating object information.

In the case where the echo signal corresponds to a sidelobe transmitted detection signal and is received upon the mainbeam of main antenna 12, the received echo signal is coupled through directional coupler 16, transmit/receive module 20, optional RF/IF converter 64, directional coupler 66, directional coupler 72 to radar receiver 80. The received echo signal is also coupled through directional coupler 72 to SLID detector 76 which generates the activity flag signal to timing logic 46. Timing logic 46 again generates the reset signal and the transmit and receive sync signals. Since no portion of the received echo signal is received at the auxiliary antenna, there is no echo signal to be modulated by receive modulator 38. SLID detector 76 utilizes the transmit sync signal in detecting the sidelobe transmit modulation pattern in the echo signal. Upon detection of the transmit modulation pattern in the echo signal, SLID detector generates a sidelobe flag signal which is output on line 92 to radar display 84. In the optional embodiment, the sidelobe transmit flag signal may also be provided by line 94 to radar display 84.

When an echo signal containing the transmit modulation pattern is received on a sidelobe of main antenna 12, the signal is similarly coupled through directional coupler 16, transmit/receive module 20, optional RF/IF converter 64, directional coupler 66, directional coupler 72, radar receiver 80 to radar display 84. Furthermore, the echo signal is also received at auxiliary antenna 32. The echo signal, as received at auxiliary antenna 32 containing the transmit modulation, is coupled through transmit/receive module 28, optional RF/IF converter 36, to receive modulator 38. Receive modulator 38 impresses a receive modulation pattern into the received echo signal. The echo signal coupled out of receive modulator 38 to directional coupler 66 contains both the transmit and receive modulation patterns. This modulated echo signal is coupled by directional coupler 72 to SLID detector where both modulation patterns are detected in a manner as previously described for both modulation pattern. SLID detector 76 provides the sidelobe flag signal on line 92 to radar display 84. In addition, the optional sidelobe transmit and sidelobe receive flag signals may be output respectively on lines 94 and 96 to radar display 84.

In the final case, should the received echo signal be one corresponding to a detection signal transmitted and received on the mainbeam of main antenna 12, it is coupled through directional coupler 16, transmit/receive module 20, optional RF/IF converter 64, directional coupler 66, directional coupler 72 to radar receiver 80 and ultimately to radar display 84. Directional coupler 72 couples the received echo signal to SLID detector 76. SLID detector 76 generates in response to the signal the activity flag signal on line 90. Timing logic 46 in response to the activity flag signal generates the transmit and receive sync signals provided to SLID detector 76. However, since the echo signal was received only on the mainbeam, no portion of the echo signal is received by auxiliary antenna 32. Therefore, no portion of the echo signal is coupled through receive modulator 38 via directional couplers 66 and 72 to SLID detector 76. With no modulation detected in the received signal by SLID detector 76, there is no output of a sidelobe flag signal or the optional sidelobe transmit flag or sidelobe receive flag signals to radar display 84. The signal as received by radar display is thus interpreted as a mainbeam transmitted detection signal and mainbeam received echo signal.

Figure 2:
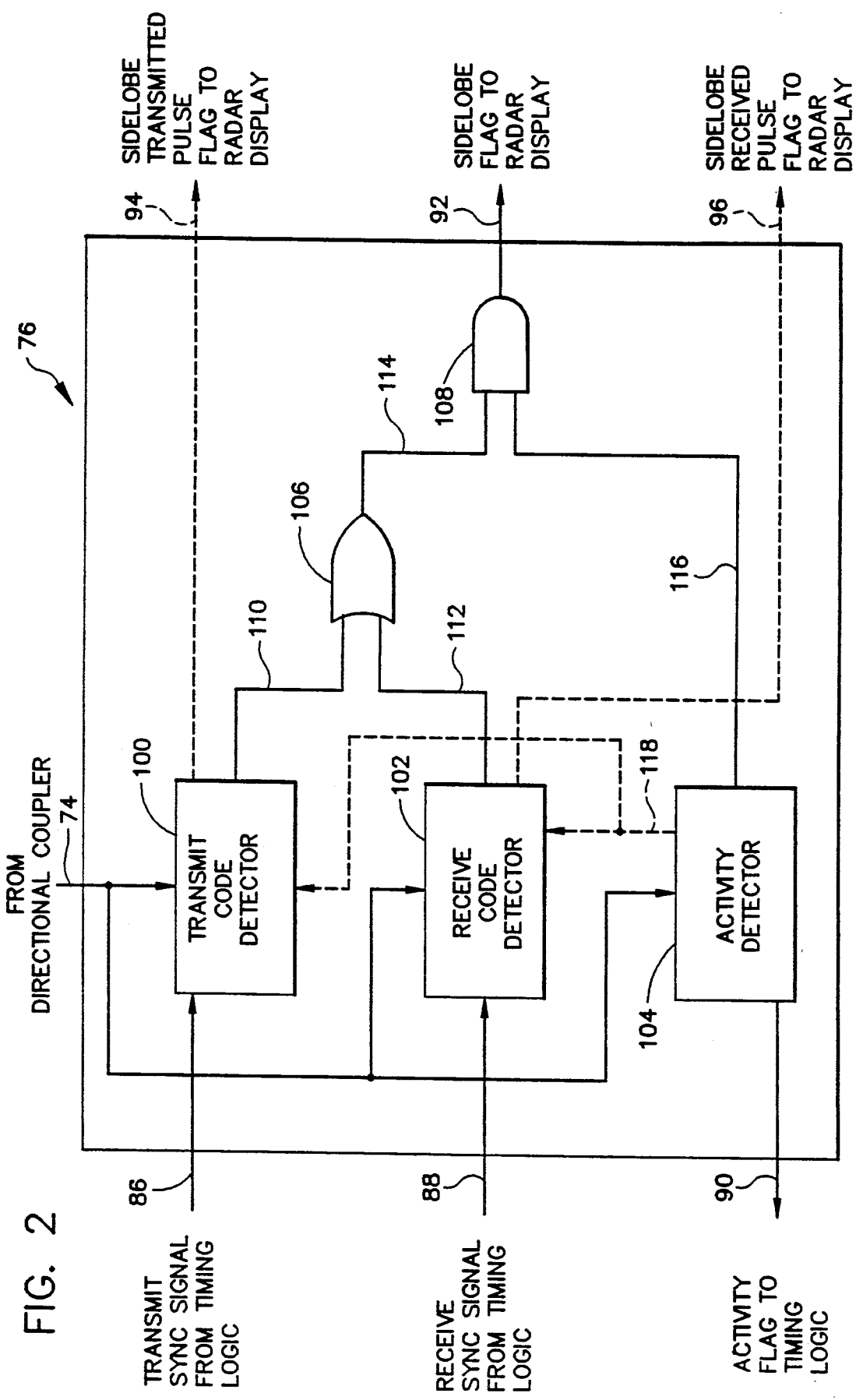
FIG. 2 is a block diagram of the sidelobe identification and discrimination (SLID) detector of Figure.

FIG. 2 illustrates an exemplary embodiment of SLID detector 76 of FIG. 1. SLID detector 76 is comprised of transmit code detector 100, receive code detector 102, activity detector 104, and logic gates 106 and 108.

SLID detector 76 includes transmit code detector 100 which has an input to receive on line 74 a portion of the antenna sidelobe and/or mainbeam received signal. Transmit code detector 100 is also coupled by line 86 to timing logic 46 for receiving the transmit sync signal from timing logic 46. Transmit code detector 100 detects modulation in the received echo signal that was impressed on a sidelobe transmitted detection signal. If the transmit modulation pattern is detected, transmit code detector 100 provides a signal in the form of a sidelobe transmit flag signal on line 110 to an input of OR gate 106. Furthermore, transmit code detector 100 may also provide the sidelobe transmit flag signal on line 94 to radar display 84.

SLID detector 76 includes receive code detector 102 which has an input to receive on line 74 a portion of the antenna sidelobe and/or mainbeam received signal. Receive code detector 102 is also coupled by line 88 to timing logic 46 for receiving a receive sync signal from timing logic 46. Receive code detector 102 detects modulation in the received signal that was impressed on a sidelobe received signal. If the receive modulation pattern is detected, receive code detector 102 provides a signal in the form of a sidelobe receive flag signal on line 112 to an input of OR gate 106. Furthermore, receive code detector 102 may also provide the sidelobe receive flag signal on line 96 to radar display 84.

The output of OR gate 106 is coupled by line 114 to an input of AND gate 108. Upon the occurrence of either a sidelobe transmit flag signal or a sidelobe receive flag signal, OR gate 106 provides an output signal on line 114 to AND gate 108.

SLID detector 76 further includes activity detector 104. SLID detector 76 has an input coupled by line 74 to directional coupler 72 for receiving a portion of the antenna received signals. Activity detector 104 is utilized to detect incoming signals that are radar echo signals. Upon identification of a echo signal, activity detector 104 outputs an activity flag signal on line 90 to timing logic 46. The activity flag signal is also provided on line 116 to the other input of AND gate 108. Upon the occurrence of both activity flag signal and a signal output from OR gate 106, indicative of either a sidelobe transmit flag signal or a sidelobe receive flag signal, AND gate 108 outputs the sidelobe flag signal on line 92 to radar display 84.

In an alternative embodiment, the activity flag signal may also be provided directly to transmit code detector 100 and receive code detector 100 via line 118. In the alternative embodiment, both transmit code detector 100 and receive code detector 102 generate internal sync signals. Transmit code detector 100 and receive code detector 102 upon receipt of the activity flag are enabled for detecting the respective sidelobe transmit or receive modulation patterns in the received signal. In this embodiment, the need for the transmit sync and receive sync signals from timing logic 46 is eliminated.

With reference to FIGS. 1 and 2, FIG. 3 illustrates the operation of the system of the present invention through a series of timing graphs. In FIG. 3, the receive modulator driver is typically, although it need not be, a free-running oscillator which provides the receive modulator driver signal, as illustrated in graph 3a, to receive modulator 38. At time $t_0$, radar transmitter 56 outputs a radar pulse for transmission over main antenna 12 and auxiliary antenna 32.

Coincident with the output of the radar pulse, timing logic 46 receives from radar transmitter 60 a control signal which enables transmit modulator driver 42. At time $t_0$, transmit modulator driver 42 outputs a transmit modulator driver signal as illustrated in graph 3b. The transmit modulator driver signal drives transmit modulator 24 so as to impress a modulation pattern upon the portion of the radar pulse transmitted by auxiliary antenna 32 in the sidelobe radiation pattern of main antenna 12. The mainbeam transmitted pulse is unmodulated and appears in graph 3c. The sidelobe transmitted pulse includes the transmit modulation pattern and is illustrated in graph 3d. At time $t_1$, timing logic 46 disables transmit modulator driver 42 from providing the transmit modulator driver signal. Therefore, from time $t_1$-$t_2$, the sidelobe transmitted pulse of graph 3d is identical to the mainbeam transmitted pulse. At time $t_2$, the radar transmitter generated pulse ends, as illustrated in graphs 3c and 3d. Accordingly, the mainbeam transmitted pulse as illustrated in graph 3c, is an unmodulated pulse, while the sidelobe transmitted pulse, as illustrated in graph 3d, contains a unique transmit modulation pattern during the first portion, i.e. time $t_0$-$t_1$.

During the time period $t_2$-$t_3$, the system is controlled in accordance with the operation parameters of the particular radar system to receive an echo signal corresponding to a reflection of the transmitted pulse from an object. At time $t_3$, one of the four types of echo signals are received, i.e. (1) mainbeam transmitted-mainbeam received (graph 3g); (2) sidelobe transmitted-mainbeam received (graph 3h); (3) mainbeam transmitted-sidelobe received (graph 3i); and (4) sidelobe transmitted-sidelobe received (graph 3j). At time $t_3$, and upon the detection of a valid radar echo signal, an activity flag signal (graph 3m) is generated by SLID detector 76, and in particular by activity detector 104. Timing logic 46, in addition, generates the reset signal which is output on line 54 to receive modulator 44 for synchronizing the receive modulator driver signal.

Should the received signal be a mainbeam transmitted-mainbeam received echo signal as illustrated in graph 3g, the activity flag signal as illustrated in graph 3m, is generated with SLID detector 76 activated for detecting a sidelobe transmitted or received signal. As illustrated in graph 3e, during the period $t_3$-$t_4$, the transmit sync signal is generated by timing logic 46 and output to transmit code detector 100 for detecting the presence of the transmit modulation pattern in the received signal. Similarly, during the time period $t_3$-$t_5$, the receive sync signal as illustrated in graph 3f is provided by timing logic 46 to receive code detector 102. Receive code detector during the period $t_3$-$t_5$ utilizes the receive sync signal for detecting the presence of the receive modulation pattern in the received signal.

Graph 3h illustrates a sidelobe transmitted pulse that is received on the mainbeam, as input to SLID detector 76. The received signal lasts from time $t_3$-$t_5$ while during the time $t_3$-$t_4$ the received signal contains the transmit modulation pattern. Transmit code detector 100 utilizes the transmit sync signal to detect the transmit modulation pattern. Upon detection of the transmit modulation pattern, transmit code detector 100 generates the sidelobe transmit flag signal as illustrated in graph 3k. The sidelobe transmit flag signal is utilized by logic gates 106 and 108 along with the activity flag signal to generate the sidelobe flag signal as illustrated in graph 3n.

Graph 3i illustrates a mainbeam transmitted pulse that is received on the sidelobe, as input to SLID detector 76. The received signal lasts from time $t_3$-$t_5$ and contains the receive modulation pattern during the period $t_3$-$t_5$. Receive code detector 102 utilizes the receive sync signal to detect the receive modulation pattern. Upon detection of the receive modulation pattern, receive code detector 102 generates the sidelobe receive flag signal as illustrated in graph 3l. The sidelobe receive flag signal is utilized by logic gates 106 and 108 along with the activity flag signal to generate the sidelobe flag signal as illustrated in graph 3o.

Should the echo signal originate from a sidelobe transmitted signal which is also received on the antenna sidelobe, the received signal would appear to SLID detector 76 as illustrated in graph 3j. The received echo signal pulse lasts from the period $t_3$-$t_5$ and during the period $t_3$-$t_4$ the received signal contains both the transmit and receive modulation patterns. During the period $t_4$-$t_5$, the received signal contains only the receive modulation pattern. With modulation present during the entire signal period, i.e. $t_3$-$t_5$, the sidelobe flag is present during the period $t_3$-$t_5$ and is illustrated in graph 3o. The sidelobe transmit flag signal would appear as illustrated in graph 3k, while the sidelobe receive flag signal would appear as illustrated in graph 3l.

The timing diagrams of FIG. 3, as illustrated in the series of graphs 3a-3o, are merely illustrative of system timing in one embodiment of the present invention. It is envisioned that many various timing sequences and schemes may be utilized that are dependent upon the particular modulation schemes for labeling sidelobe transmitted and received signals.

Figure 4:
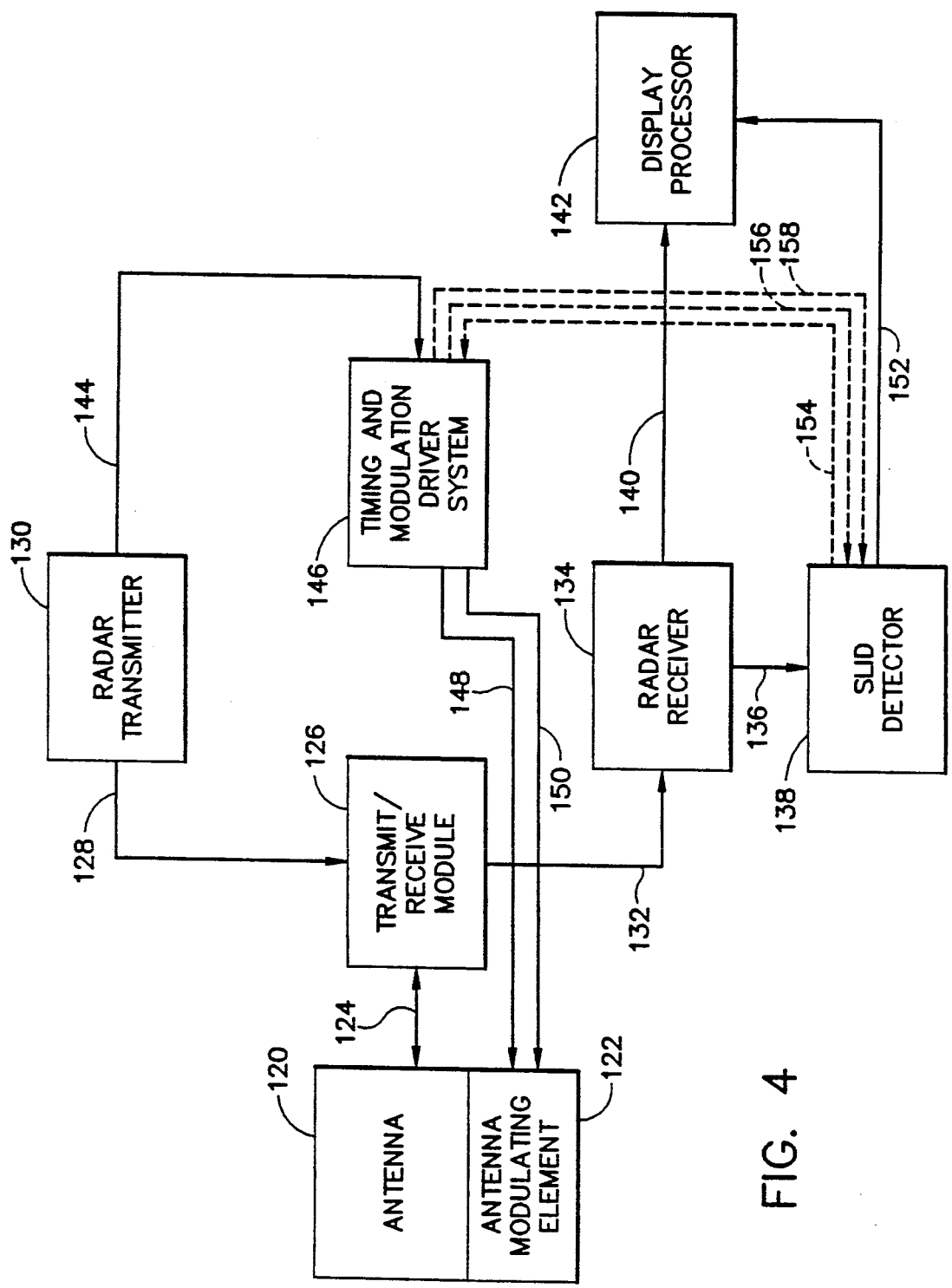
FIG. 4 is a block diagram of another preferred embodiment of a radar system employing the novel features of the sidelobe identification and discrimination system of the present invention.

FIG. 4 illustrates an alternative embodiment of the present invention. In FIG. 4, the antenna system includes an antenna 120 which incorporates an antenna modulating element 122 for modulating signals transmitted or received on the sidelobes of antenna 120. Antenna modulating element 122 may be configured as a variable scatterer such as disclosed in U.S. Pat. No. 4,250,506 which is incorporated by reference herein. Antenna 120 is coupled by line 124 to transmit/receive module 126. Transmit/receive module 126 has an input coupled by line 128 to the output of radar transmitter 130. Transmit/receive module 126 also includes an output coupled by line 132 to radar receiver 134. Radar receiver 134 provides an output signal on line 136 to SLID detector 138. Radar receiver 134 also has an output coupled by line 140 to an input of display processor 142.

Radar transmitter 130 is also coupled by line 144 to timing and modulation driver system 146. Timing and modulation system driver 146 respectively provides transmit and receive modulator driver signals to antenna modulating element 122 on lines 148 and 150. SLID detector 138 is further coupled by line 152 to display processor 142 for providing a sidelobe flag signal to display processor 142.

In operation of the system of FIG. 4, radar transmitter 130 generates a detection signal in the form of a radar pulse which is coupled by line 128 to transmit/receive module 126. The radar pulse is coupled by transmit/receive module 126 via line 124 to antenna 120 where it is radiated on the antenna mainbeam and sidelobes.

Simultaneously with the output of the radar pulse from radar transmitter 130, radar transmitter 130 outputs a control signal on line 144 to timing and modulation driver system 146. Timing and modulation driver system 146 in response to the control signal generates a transmit modulator driver signal on line 148 to antenna modulating element 122. Antenna modulating element 122 in response to the transmit modulator driver signal impresses the transmit modulation pattern upon the portion of the radar signal pulse radiated upon the antenna sidelobes.

The object reflected detection signal, i.e. echo signal, of an echo signal is received at the antenna. Depending upon the object and antenna position, the echo signal may be received upon either of the mainbeam or one of the sidelobes of antenna 120. During a period of time other than when radar transmitter 130 is transmitting a radar pulse, timing and modulation driver 146 may generate a receive modulator driver signal which is output on line 150 to antenna modulating element 122. For echo signals received upon a sidelobe of antenna 120, antenna modulating element 122 impresses the receive modulation pattern upon the received signals. The received signal, whether sidelobe or mainbeam received, is coupled by line 124 to transmit/receive module 126. Transmit/receive module 126 couples the received signal via line 132 to radar receiver 134. Radar receiver 134 couples the signal on line 140 to the radar display processor 142 and via line 136 to SLID detector 138.

SLID detector 138 may be configured as illustrated in FIG. 2. However, as illustrated in FIG. 4, the transmit code detector and receive code detector may generate internal sync signals such that none are required from timing and modulation driver system 146. In addition, the SLID detector activity detector may provide the activity flag signal, such as on line 118 of FIG. 2, to the transmit code detector and receive code detectors as an activation signal for modulation detection.

In the alternative, SLID detector 138 may be configured identical to the SLID detector 76 of FIG. 2. When SLID detector 138 is configured as illustrated in FIG. 2, an activity flag signal is coupled by line 154 to timing and modulation driver system 146. Similarly, timing and modulation driver system 146 respectively couples transmit and receive sync signals on lines 156 and 158 to SLID detector 138. SLID detector 138 upon detection of the transmit and/or receive modulation pattern in the received radar pulse generates a sidelobe flag signal which is output on line 152 to display processor 142. The sidelobe flag signal thus provides display processor 142 indication that the received echo signal corresponds to a sidelobe transmitted detection signal ad/or a sidelobe received echo signal. Although not illustrated in FIG. 4, SLID detector 138 may also output to display processor 142 a sidelobe transmit flag signal and/or a sidelobe receive flag signal as discussed with reference to FIGS. 1 and 2.

The exemplary embodiments described herein illustrate various arrangements for impressing the same or different modulation patterns upon a radar signal for identifying sidelobe transmitted and/or received radar echo signals. It is envisioned that many various modulation techniques and timing schemes may be utilized to accomplish the results of the present invention. It is, therefore, understood that the previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

We claim:

1. In a radar system having a transmitter for generating at least one detection signal, an antenna system defining a mainbeam and sidelobe radiation pattern for radiating each detection signal and for receiving incoming signals, certain ones of said incoming signals being echo signals each corresponding to a reflection of a radiated detection signals from an object, and a receiver system for processing each echo signal, received by said antenna system, a system for identifying each echo signal received upon a sidelobe of said antenna system and each received echo signal having a corresponding detection signal radiated on a sidelobe of said antenna system, said system comprising:

modulation means operatively coupled to an antenna system for modulating, according to a predetermined modulation pattern, each antenna system sidelobe radiated detection signal and each antenna system sidelobe received echo signal, wherein said modulation pattern forms an identifiable label upon each antenna system sidelobe radiated detection signal and each antenna system received echo signal;

detector means for coupling to an antenna system for, receiving from an antenna system each received echo signal, inspecting each received echo signal for a presence of modulation impressed by said modulation means thereupon or in a corresponding radiated detection signal and providing an indication signal corresponding to each echo signal having said modulation.

2. The system of claim 1 wherein said modulation means comprises:

driver means for generating a modulation signal; and modulator means responsive to said modulation signal for modifying each antenna system sidelobe radiated detection signal and each antenna system sidelobe received echo signal according to said predetermined modulation pattern.

3. The system of claim 1 wherein said detector means identifies each echo signal having said first modulation pattern and provides a sidelobe transmit indication signal as said indication signal, and identifies each echo signal having said second modulation pattern and provides a sidelobe receive indication signal as said indication signal.

4. The system of claim 1 wherein said detector means comprises:

transmit modulation detector means for identifying each received echo signal having said first modulation pattern and providing a sidelobe transmit indication signal; and receive modulation detector means for identifying each received echo signal having said second modulation pattern and providing a sidelobe receive indication signal.

5. The system of claim 4 wherein said detector means further comprises activity detector means for receiving each incoming signal, identifying each incoming signal in a form of an echo signal, and providing a corresponding activity signal.

6. The system of claim 5 wherein said detector means further comprises logic means responsive to each substantially coincident occurrence of said activity signal and at last one of said sidelobe transmit and sidelobe receive indication signals for generating a sidelobe indication signal.

7. In a radar system having a transmitter for generating at least one detection signal, an antenna having mainbeam and sidelobe radiation patterns for transmitting each detection signal and for receiving incoming electromagnetic signals including echo signals each corresponding to a reflection of a detection signal from an object, and a receiver for processing each received echo signal, a system for identifying each echo signal received upon a sidelobe of said antenna and each received echo signal having a corresponding detection signal transmitted on a sidelobe of said antenna, said system comprising:

driver means for generating first and second modulation signals;

modulator means responsive to said first modulation signal for modulating each antenna sidelobe transmitted detection signal according to a first modulation pattern wherein each echo signal corresponding to an object reflected antenna sidelobe transmitted detection contains said first modulation pattern, and responsive to said second modulation signal for modulating each antenna sidelobe received echo signal according to a second modulation pattern, said first modulation pattern forming a first uniquely identifiable label within each antenna sidelobe transmitted detection signal and said second modulator pattern forming a second uniquely identifiable label within each antenna sidelobe received echo signal;

detection means coupled to said modulation means for, receiving each received echo signal, detecting each received echo signal having at least one of said first and second modulation patterns, and providing an indication signal upon detection of at least one of said first and second modulation patterns in each received echo signal.

8. The system of claim 7 wherein said detector means comprises:

transmit modulation detector means for detecting each echo signal having said first modulation pattern and providing a sidelobe transmit indication signal; and receive modulation detector means for detecting each received echo signal having said second modulation pattern and providing a sidelobe receive indication signal.

9. The system of claim 8 wherein said detector means further comprises activity detector means for receiving each incoming signal, detecting each incoming signal in a form of an echo signal, and providing a corresponding activity signal.

10. The system of claim 9 wherein said detector means further comprises logic means responsive to an occurrence of said activity signal and at least one of said sidelobe transmit and sidelobe receive indication signals for generating a sidelobe indication signal.

11. A method for identifying antenna sidelobe transmitted and/or antenna sidelobe received signals in a radar system for detecting an object, said radar system having a transmitter for generating at least one detection signal, an antenna system with a mainbeam and at least one sidelobe for radiating each detection signal and for receiving incoming signals with certain ones of said incoming signals being echo signals with each echo signal being a reflection from an object of a corresponding transmitted detection signal, and a receiver system for processing received echo signal, comprising:

radiating at least one detection signal on at least one of said antenna mainbeam and sidelobes;

modulating each detection signal transmitted on each antenna sidelobe according to a predetermined modulation pattern;

receiving at least one echo signal on at least one of said antenna mainbeam and sidelobes;

modulating each echo signal received upon each antenna sidelobe according to said modulation pattern;

inspecting each received echo signal for said modulation pattern; and providing an identification signal for each received echo signal in which said modulation pattern is present.

12. The method of claim 11 wherein said step of providing an identification signal further comprises the steps of:

providing a sidelobe transmit identification signal when said transmit modulation pattern is present in a received echo signal.

13. The method of claim 11 further comprising the steps of:
   inspecting each received incoming signal;
   identifying said certain ones of said incoming signals as echo signals; and
   providing an activity signal upon identification of a received incoming signal as an echo signal.

14. The method of claim 11 further comprising the steps of:
   inspecting each received incoming signal;
   identifying said certain ones of said incoming signals as echo signals; and
   providing an activity signal upon identification of a received incoming signal as an echo signal.

* * * * *

UNITED STATES PATENT AND TRADEMARK OFFICE
CERTIFICATE OF CORRECTION

PATENT NO. : 5,072,225

DATED : December 10, 1991

INVENTOR(S) : Paul R. Eberhardt, et al.

It is certified that error appears in the above-identified patent and that said Letters Patent is hereby corrected as shown below:

Column 10, Line 66, "signal and" should read --signal according to a first modulation pattern and--;

Column 10, Line 67, "signal, wherein" should read --signal according to a second modulation pattern, wherein--;

Column 10, Line 68, "pattern forms" should read --patterns respectively form--;

Column 10, Line 68, "label" should read --labels--;

Column 12, Lines 51-52, "predetermined modulation" should read --predetermined transmit modulation--;

Column 12, Line 56, "to said modulation" should read --to a predetermined receive modulation--;

Column 12, Lines 58-59, "said modulation pattern;" should read --said received and transmit modulation patterns;--; and

UNITED STATES PATENT AND TRADEMARK OFFICE
CERTIFICATE OF CORRECTION

PATENT NO. : 5,072,225

DATED : December 10, 1991

INVENTOR(S) : Paul R. Eberhardt, et al

It is certified that error appears in the above-identified patent and that said Letters Patent is hereby corrected as shown below:

Column 12, line 61, "which said modulation pattern is" should read --which at least one of said modulation patterns is--.

Signed and Sealed this

Twenty-seventh Day of April, 1993

Attest:

MICHAEL K. KIRK

Attesting Officer

Acting Commissioner of Patents and Trademarks